United States Patent

Karasudani

[11] 4,084,666
[45] Apr. 18, 1978

[54] DISC BRAKE CALIPER MOUNTING

[75] Inventor: Yasuo Karasudani, Yokohama, Japan

[73] Assignee: Tokico Ltd., Kawasaki, Japan

[21] Appl. No.: 766,506

[22] Filed: Feb. 7, 1977

[30] Foreign Application Priority Data

Feb. 12, 1976 Japan .................................. 51-15358

[51] Int. Cl.² .......................................... F16D 65/02
[52] U.S. Cl. ................................................. 188/73.3
[58] Field of Search ..................... 188/71.1, 72.4, 73.3, 188/73.5

[56] References Cited

U.S. PATENT DOCUMENTS

| 3,495,689 | 2/1970 | Peach | 188/72.4 |
| 3,656,590 | 4/1972 | Newstead | 188/73.3 |
| 3,881,576 | 5/1975 | Haraikawa et al. | 188/73.3 |
| 3,942,611 | 3/1976 | Burnett | 188/73.3 |
| 3,976,169 | 8/1976 | Ogawa | 188/73.3 |
| 3,977,498 | 8/1976 | Ogawa | 188/73.3 |

FOREIGN PATENT DOCUMENTS

| 2,538,017 | 3/1976 | Germany | 188/73.3 |
| 1,079,911 | 8/1967 | United Kingdom | 188/73.3 |

Primary Examiner—Trygve M. Blix
Assistant Examiner—Edward R. Kazenske
Attorney, Agent, or Firm—Wenderoth, Lind & Ponack

[57] ABSTRACT

A disc brake of the type which has a caliper member slidably supported on a non-rotatable member and straddling a portion of the periphery of a rotatable disc, and a pin guiding the sliding movement of the caliper member relative to the supporting member, is provided with a resilient ring disposed between the pin and a guide bore, and the ring includes an integral dust cover portion extending outward of the guide bore for protecting the portion of the pin which is exposed outward of the guide bore.

2 Claims, 7 Drawing Figures

DISC BRAKE CALIPER MOUNTING

This invention relates to a disc brake and particularly, to a disc brake of the type comprising a caliper member slidably supported on a non-rotatable member and straddling a portion of the periphery of a rotatable member, an actuator mounted on the caliper member for applying one of the brake pads against one side of the disc and applying the other brake pad against the opposite side of the disc through the caliper member, and at least one pin received slidably in a guide bore for mounting the caliper member on the non-rotatable member.

The pin can be secured to the caliper member for cooperating with a guide bore formed in the non-rotatable member. Alternatively, the pin is secured to the non-rotatable member and is received in a guide bore formed in the caliper. In either case, the pin has heretofore been fitted in the guide bore loosely and, thus, for preventing vibration of the caliper and attaining stable sliding movement of the caliper, at least one resilient ring has usually been mounted between the pin and the guide bore. Since the pin or the guide bore moves slidably relative to the resilient ring during application of the brake, a separate dust cover or a boot has been provided for preventing ingress of dust, water or the like from the sliding portion between the pin and the guide bore, particularly, from the portion outward of the resilient ring. But, it is expensive to manufacture and troublesome for the assembling and disassembling operation to provide a vibration preventing resilient ring and a separate dust preventing boot between the pin and the guide bore.

The caliper is usually formed of two parts secured rigidly to one another by a pair of bolts extending respectively in the direction of the axis of the disc. One of the elements is disposed on one side of the disc and incorporates an actuator or a hydraulic cylinder piston therein, and the other caliper element is disposed on the opposite side of the disc and carries one of the brake pads or an indirectly actuated pad. In such case, the bolts securing the two caliper elements together may also act as the pins for guiding sliding movement of the caliper relative to the non-rotatable member. Since the bolts each act as a tension member securing the two caliper parts together and as a sliding member for guiding the sliding movement of the caliper, it has been necessary to form the bolts with ample strength and a precision surface finish resulting an increased manufacturing cost.

An object of the present invention is to provide a disc brake of the aforementioned type in which the resilient ring interposed between the pin and the guide bore for preventing vibrations of the caliper is mounted on the open end portion of the guide bore and has an integral dust cover portion which extends outward of the guide bore and covers a portion of the pin extending out of the guide bore.

Preferably, there is a pair of circumferentially spaced and axially extending pins secured to the caliper and received slidably in guide bores formed in the non-rotatable member. Alternately, the pins may be secured to the non-rotatable member and the guide bores slidably receiving the pin are formed in the caliper. In the former case, each of the axially extending pins can be a bolt securing the two parts of the caliper to one another and a sleeve covering the stem portion of the bolt and being clamped between the two caliper parts and extending through a guide bore formed in the non-rotatable member.

The present invention will be described in detail in conjunction with the accompanying drawings illustrating some embodiments of the present invention, in which.

Figure 1:
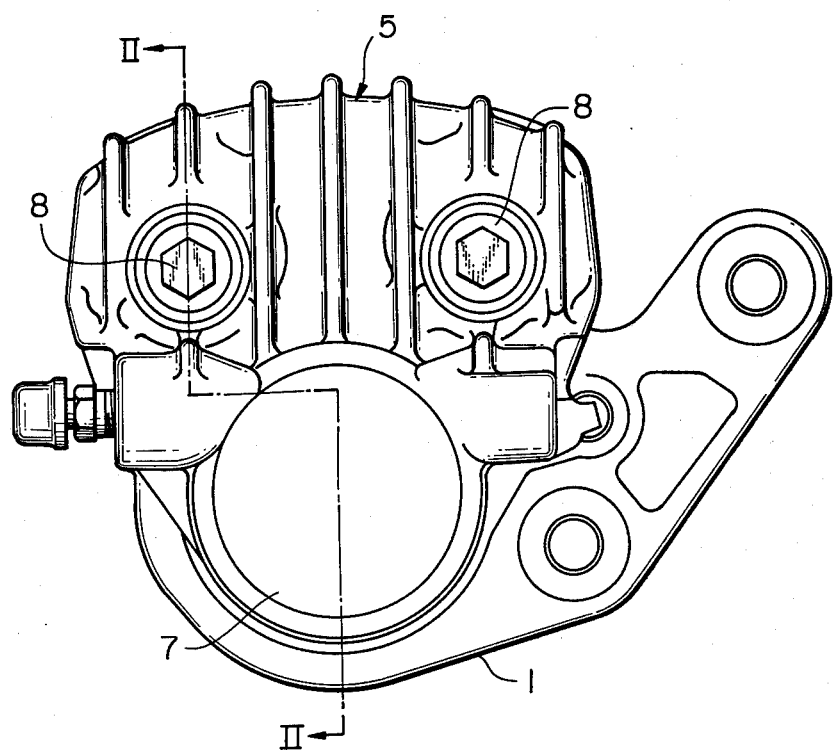
FIG. 1 is a front view of a disc brake according to the present invention.
Figure 2:
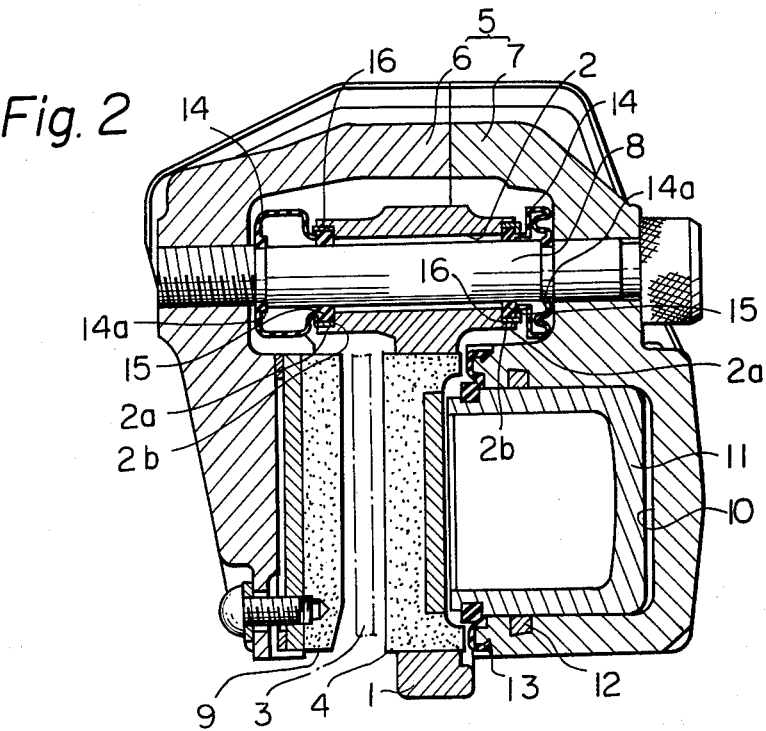
FIG. 2 is a cross-sectional view along line II—II in FIG. 1.

The disc brake shown in FIGS. 1 and 2 comprises a non-rotatable member 1 adapted to be secured to a vehicle body (not shown) and having a pair of guide bores 2 (only one of which is shown in FIG. 2) for slidably receiving pins 8, a brake pad 4 disposed on one side of a rotatable disc 3 and movably supported on the non-rotatable member 1 for movement toward and away from the disc 3, and a caliper 5 consisting of two caliper elements 6 and 7 which are connected rigidly by the pins 8. Each of the pins 8 extends through one of the guide bores 2 of the non-rotatable member 1 with a radial clearance therebetween. A brake pad 9 disposed on the other side of the disc 3 and opposed to the brake pad 4 is secured to one of caliper elements 6, and a cylinder 10 is formed in the other caliper element 7. A piston 11 is incorporated in the cylinder 10 for receiving pressure of oil introduced into the cylinder 10 to urge the brake pad 4 against the disc 3. A seal 12 prevents leakage of oil from the cylinder 10, and a dust excluding boot 13 is provided between the piston 11 and the cylinder 10.

Resilient rings 15 are provided at the opposite open end portions 2a of the guide bores 2, and each of the rings 15 is retained in its position by an annular retainer 16 having a generally L-shaped cross-section and pressure fitted in a large diameter bore portion 2b formed in each of the opposite end portion 2a of the guide bores 2, whereby, axial and radial displacement of the ring 15 is prevented. the rings 15 contact the outer periphery of the pins 8 resiliently to prevent vibrations of the caliper 5, and have a radial thickness sufficient to control or damp the vibrations. The ring 15 has a dust cover portion 14 integral therewith which extends outward of the bore 2 and covers a portion of the pin projecting out of the guide bore 2. The free end 14a of the dust cover portion 14 is fitted in a groove formed in the pin 8.

With the disc brake having this construction, it is possible to prevent vibrations of the caliper and to attain a stable sliding movement of the caliper 5 relative to the non-rotatable member 1, and also to protect the portions of the pins 8 extending outward of the guide bore 2 from dust, water or the like without increasing the number of parts constituting the disc brake. Further, even when the dust cover portion 14 of the resilient ring 15 is damaged, ingress of dust, water or the like into the interior of the guide bore 2 can be prevented by the annular ring portion 15, and a stable sliding movement of the caliper 5 can be assured. Preferably, oil or grease may be enclosed in the annular space between the guide bore 2 and the pin 8, the opposite ends of the space being sealed by the annular rings 15.

Figure 3:
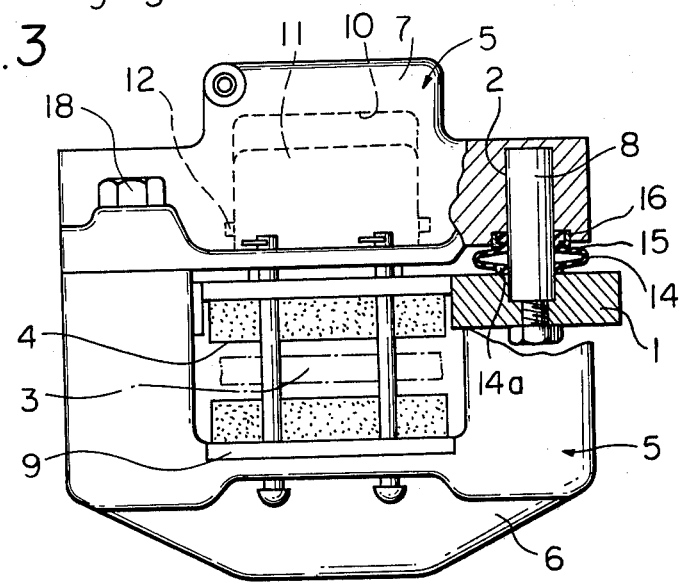
FIG. 3 is a partially broken away plan view showing another embodiment of the present invention.
Figure 4:
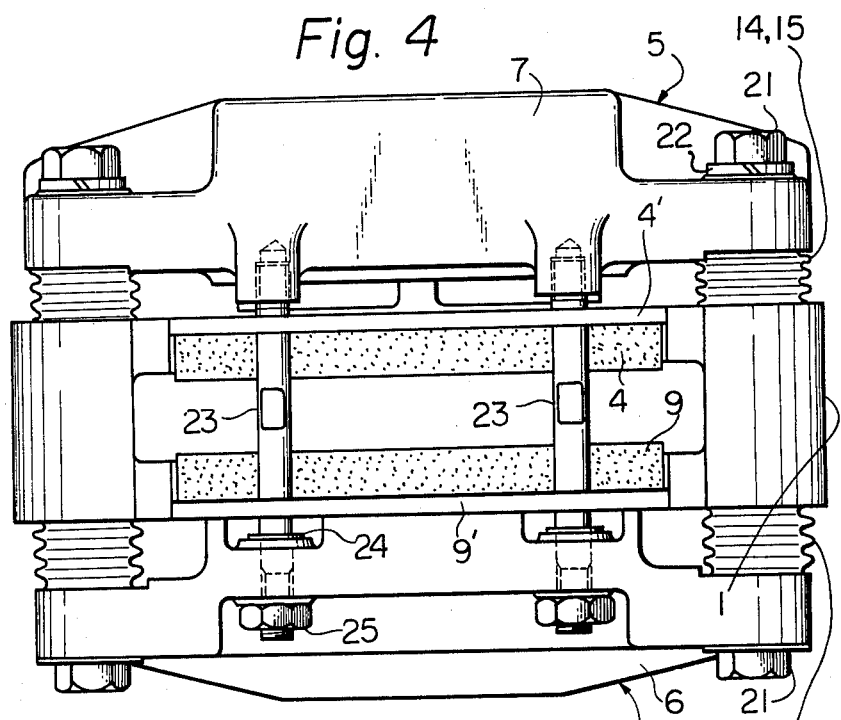
FIG. 4 is a plan view showing a further embodiment of the present invention.
Figure 5:
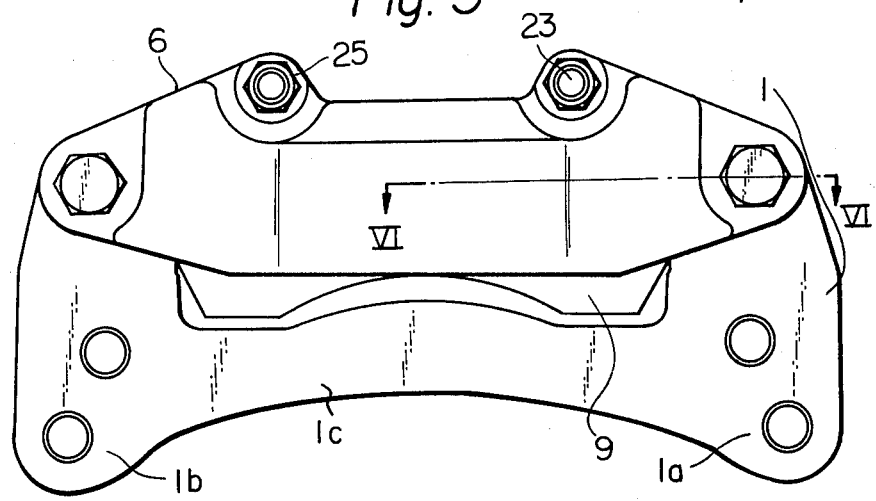
FIG. 5 is a front view of the disc brake of FIG. 4.
Figure 6:
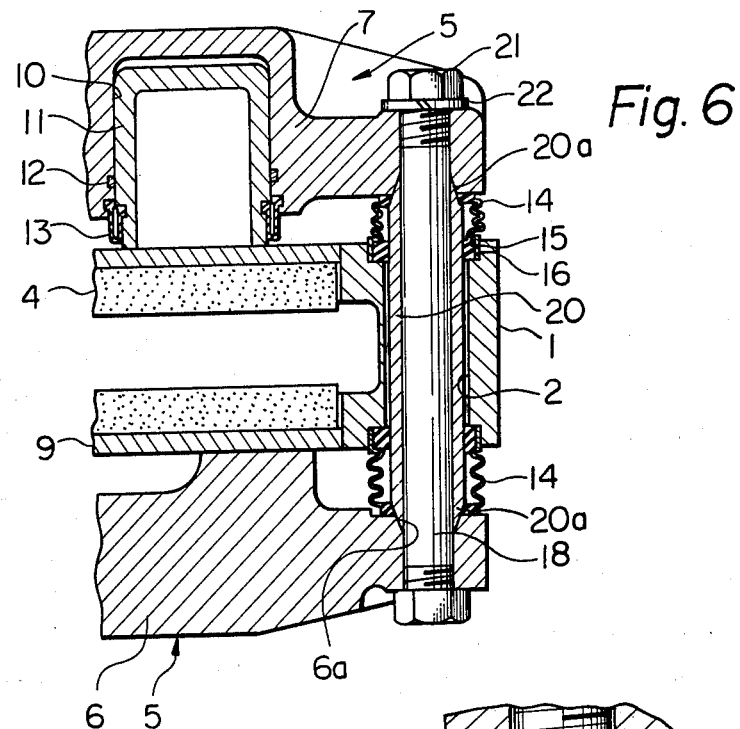
FIG. 6 is a partial cross-sectional view taken along line VI—VI in FIG. 5.
Figure 7:
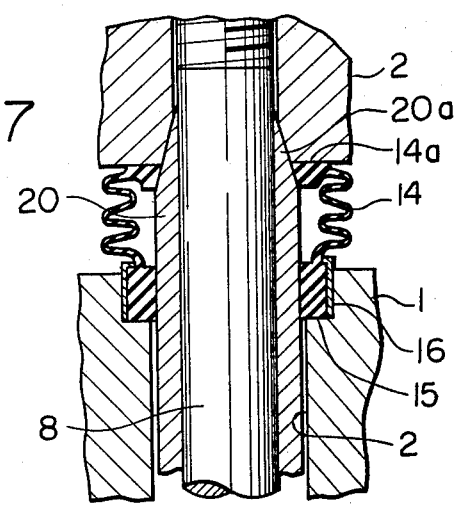
FIG. 7 is an enlarged cross-sectional view showing a portion of FIG. 6.

FIG. 3 shows another embodiment of the present invention, in which, a pair of pins 8 (only one is shown in the drawing) are secured to non-rotatable member 1 and extend in the direction of the axis of disc 3, and a pair of guide bores 2 are formed in caliper 5 for slidably receiving the pins 8. A resilient ring 15 having a construction similar to that of the first embodiment is mounted in the open end portion 2a of the guide bore 2 and an end portion 14a of the dust cover portion 14 of the ring 15 is fitted around the root portion of the pin 8 as shown. The guide bore 2 is formed as a blind bore, and it is therefore preferable to form a very small hole such as a pinhole in the resilient ring 15 to vent air in the bore 2 to the inside of the dust cover portion 14 to avoid the air in the bore 2 being compressed when inserting the pin 8 into the bore 2. Alternately, a vent hole may be provided in the bottom portion of the guide bore 2 which may be closed by a suitable plug after inserting the pin 8 into the bore 2. In FIG. 3, the caliper comprises two caliper parts 6 and 7 which are rigidly connected by a pair of bolts 18 (one of which is omitted in the drawing).

FIGS. 4 – 7 show a further embodiment of the present invention which is generally similar to the first embodiment and corresponding numerals are applied to corresponding parts.

In the embodiment, two caliper elements 6 and 7 are connected rigidly by a pair of circumferentially spaced bolts 18 having washers 22 and nuts 21 on the opposite ends thereof and sleeves 20 surrounding the shank portions of the bolts 18 respectively. The sleeves 20 extend through guide bores 2 formed in the non-rotatable member 1 with a radial clearance therebetween. Thus, the sleeves 20 act as the pin guiding the sliding movement of the caliper relative to the non-rotatable member 1. In the embodiment the opposite ends 20a of the sleeve 20 are frusto-conical and engage respectively in correspondingly shaped recesses formed in the caliper elements 6 and 7 for providing the desired alignment between the caliper elements 6 and 7, and the sleeves 20 act partly as structural members connecting the caliper elements together. It will be noted that the bolts 18 may be formed with stepped portions on the opposite end portions thereof for engaging with correspondingly shaped stepped portions formed in bores receiving the bolts therein (similar to FIG. 3) so that the connection between the two caliper elements is attained solely by the bolts 18.

Since the caliper elements 6 and 7 in the third embodiment are secured mainly by the bolts 18 which may be formed of a high strength material, and the sliding movement of the caliper is effected by the sliding movement of the sleeves 20 in the resilient rings 15, it is possible to form the sleeves 20 of a material having good machinability which can be given a good surface finish on the outer peripheral surface.

In the embodiment, the brake pads 4 and 9 are guided slidably in the non-rotatable member 1 which straddles a portion of the periphery of rotatable disc and receives braking torque directly from the brake pads 4 and 9 the brake is applied. Thus, the caliper 5 can be floatingly mounted in the guide bores 2 of the non-rotatable member 1, which reduces the resistance of sliding movement of the sleeve 20 in the resilient ring portion 15 and reduces wear of the resilient ring. A pair of circumferentially spaced bolts 23 is mounted between the caliper elements 6 and 7 so as to extend through openings (not shown) formed in back plates 4' and 9' of the brake pads respectively so as to guide the movement of the brake pads toward and away from the rotatable disc and to retain the brake pads in the proper position in the disc brake.

Each of the free ends 14a of a dust cover portion 14 of the resilient ring 15 has a ring-shaped reinforcing portion therein having the inner circumferential surface tapered in a shape complementary to the tapered portion 20a of the end of the sleeve 20 which engages with the part of the conically shaped portion 20a of the sleeve 20 which is outside of the flared portion of the bolt receiving recesses at the adjacent surface of the caliper elements 6 or 7, so that the entire surface of the sleeve 20 which is outside of the bore 2 is covered by the resilient ring 15 and the dust cover portion 14 thereof.

As described above, the disc brake according to the present invention includes an integral resilient ring and dust cover which can prevent vibrations of the caliper, attain a stable sliding movement of the caliper, and protect the portion of the pin which is outside of the guide bore, without increasing the number of parts of the brake. Further, since the resilient ring and the dust cover are formed as a single integral member, it is easy to assemble or disassemble the disc brake, so that mistakes in the assembling operation are prevented. Further, even when the dust cover portion of the resilient ring is torn or otherwise damaged ingress of dust water or the like into the sliding portion can be prevented by the resilient ring portion, thus assuring reliable operation of the disc brake.

What is claimed is:

1. A disc brake comprising a rotatable disc, a non-rotatable member having a portion straddling a portion of the outer periphery of the rotatable disc, a pair of brake pads disposed on the opposite sides of the disc and slidably supported in said non-rotatable member for movement toward and away from the disc, a caliper having two caliper parts on opposite sides of said disc and said non-rotatable member, said non-rotatable member having a pair of guide bores therethrough, a pair of bolts spaced circumferentially of said disc and connected between said caliper parts through said guide bores for securing said caliper parts to each other, a sleeve surrounding the shank portion of each of the bolts and extending between the caliper parts through said guide bores, said caliper parts having bolt receiving holes therein having portions facing said non-rotatable part with a diverging enlarged shape, the opposite ends of each of said sleeves having a shape complementary to the diverging enlarged shape and being tightly seated in the diverging enlarged shape portions of said bolt receiving holes with part of said complementary shaped portions outside of said diverging enlarged shape portions of said bolt receiving holes, said part of said complementary shaped portions being ungrooved, and a resilient ring interposed between each sleeve and the corresponding guide bore at each end of said sleeve, each resilient ring having a dust cover portion integral therewith and extending along a portion of the sleeve exposed between the guide bore and the adjacent caliper part, the free end of said dust cover engaging with said complementary shaped portion of said sleeve which is outside said diverging enlarged shape portion of said bolt receiving hole for holding the free end of said dust cover portion in engagement with said sleeve adjacent the caliper part and preventing said free end from moving back toward said resilient ring.

2. A disc brake as claimed in claim 1 in which said diverging enlarged shape portions of said bolt receiving holes are conically outwardly flared, and the complementary shaped portions of said sleeves are conically tapered.

* * * * *